No. 857,033. PATENTED JUNE 18, 1907.
G. CORNILLEAU & A. SAINTE-BEUVE.
CHANGE SPEED GEAR FOR MOTOR VEHICLES.
APPLICATION FILED JULY 31, 1906.
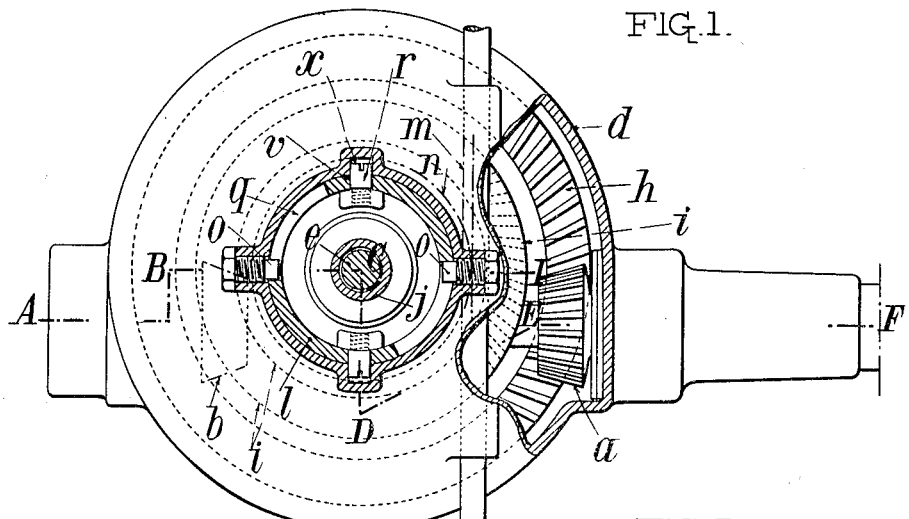
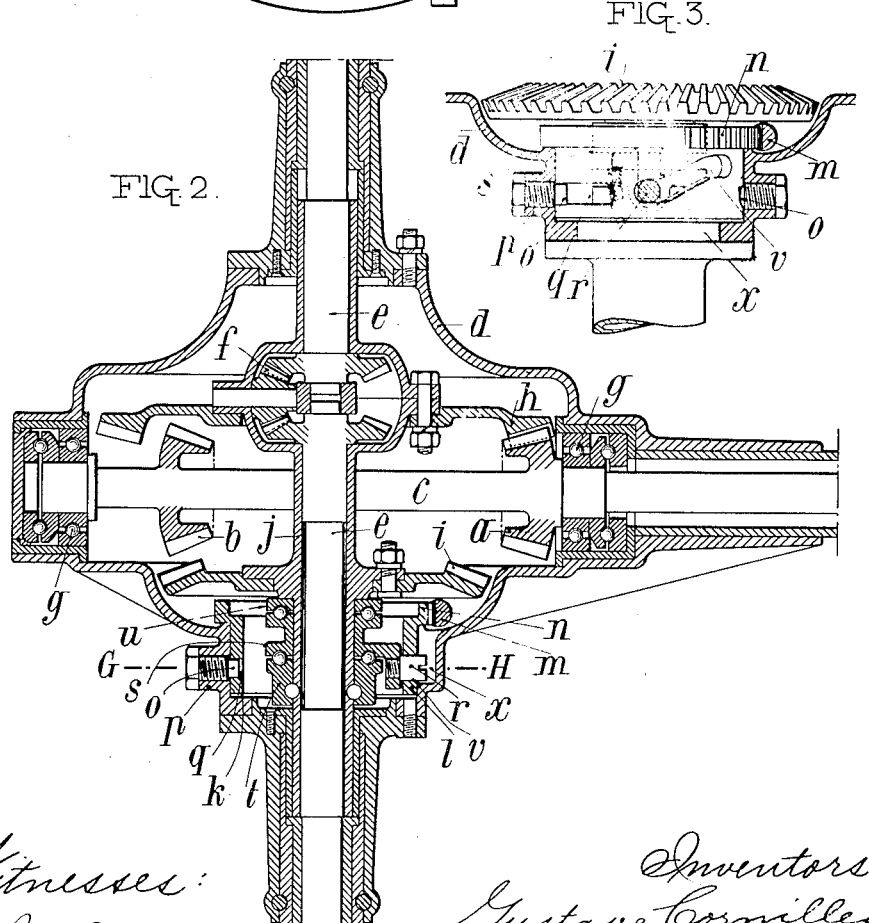

UNITED STATES PATENT OFFICE.

GUSTAVE CORNILLEAU AND AUGUSTE SAINTE-BEUVE, OF PARIS, FRANCE.

CHANGE-SPEED GEAR FOR MOTOR-VEHICLES.

No. 857,033.     Specification of Letters Patent.     Patented June 18, 1907.

Application filed July 31, 1906. Serial No. 328,526.

*To all whom it may concern:*

Be it known that we, GUSTAVE CORNILLEAU and AUGUSTE SAINTE-BEUVE, citizens of the French Republic, residing at Paris, in the Republic of France, have invented a certain new and useful Change-Speed Gear for Motor-Vehicles, of which the following is a specification.

This invention relates to a change speed gear for motor-cars having the peculiarity that the movement is transmitted direct at different speeds by means of bevel pinions capable of engaging independently with hyperboloid toothed wheels arranged on the differential mechanism and respectively brought into engagement with the said bevel pinions; the said gear or mechanism being capable of being used in combination with other ordinary or simplified arrangements, the number of speeds thus being increased.

In the accompanying drawing, Figure 1 is a view of the said gear in section on the line G—H of Fig. 2 which is a section along the broken line A—B—C—D—E—F— of Fig. 1. Fig. 3 is a partial horizontal section on line B—I of the said Fig. 1.

In the said mechanism, two bevel pinions $a\ b$ are arranged opposite each other on a common spindle $c$ driven direct from the engine, or by another change speed and reversing gear, inserted between the said spindle $c$ and the engine. The portion of the spindle $c$ carrying the bevel pinions $a\ b$, passes through the gear case $d$ which carries the portions of the axle $e$, passing normally above or below the said spindle $c$. Bearings $g\ g$, together with ball stops, support the spindle $c$ in the gear case $d$ and keep it always in the same position during its rotation.

The bevel pinions $a\ b$ are arranged at different distances from the axle $e$, so that they can engage with toothed wheels $h\ i$ with hyperboloid teeth and of different diameters, secured to a sheath $j$ made in two parts, between which is inserted the differential gear $f$ which connects the portions of the axle $e$. These toothed wheels $h\ i$ are mounted at a greater distance from each other, than the diameter of the pinions $a\ b$, so that, by longitudinally moving the sheath $j$ carrying them, one of the said wheels $h\ i$ can be brought into engagement with the bevel pinion $a$ or $b$ arranged opposite, while the other wheel remains disengaged from the corresponding pinion. Longitudinal movement of the sheath $j$ can be brought about in various manners, more particularly by the following device.

One of the bearings of the gear case $d$ in which rotate the portions of the axle $e$, is provided with a cylindrical recess $k$ receiving a sleeve $l$ capable of rotating in the said recess $k$, under the action of a tooth rack $m$ controlled from the outside of the gear case, and engaging with a toothed sector $n$ secured to the said sleeve $l$. Pins $o$ secured to the corresponding bearing $p$ of the gear case, respectively pass with their bottom ends through circumferential grooves $q$ made in the sleeve $l$, in order to prevent the latter from having any longitudinal displacement in the bearing $p$ during the rotation given to it. Other pins $r$ are secured to the lugs of another sleeve $s$ mounted loose between the ball stops $t\ u$ secured to the sheath $j$. The outer ends of the said pins $r$ pass through helical grooves $v$ made in the sleeve $l$ and can slide in other longitudinal grooves $x$ of the bearing $p$.

It follows from the above arrangement that, by turning the sleeve $l$ to a certain angle, a longitudinal movement of the pins $r$ in the grooves $x$ will be produced by the sliding of the helical grooves $v$ against the said pins $r$ which cannot follow the said movement of rotation. The pins $r$ carry with them the sleeve $s$ and move the sheath $j$, also in the longitudinal direction. According to the direction in which the said movement has been effected, one of the hyperboloid wheels $h\ i$ is brought nearer to the corresponding pinion $a$ or $b$, while the second of the said wheels moves away from the other corresponding pinion. During the movement imparted to it, the sheath $j$ slides through the corresponding bearings of the gear case $d$, carrying with it the portions of the axle $e$ which can be connected by means of claws, sliding polygonal parts, or in any other way, to the hubs of the wheels, for driving the latter, whatever be the position occupied by the sheath $j$.

High speed driving is obtained when the toothed wheel $i$ is in engagement with the pinion $b$, and low speed when the wheel $h$ is in engagement with the pinion $a$. This arrangement of the pinions $a\ b$ operating hyperboloid toothed wheels enables the movement of the spindle $c$ to be transmitted direct to the differential gear, without reversing the direction of rotation of the latter.

What we claim as our invention and desire to secure by Letters Patent is—

1. In a change speed gear for motor vehicles and in combination, a driving axle in two portions, a differential gear connecting said portions, a sheath for said gear, two opposed hyperboloid toothed wheels of differing diameter secured thereon, a spindle driven from the engine, said spindle being arranged transverse of the axis of said sheath and passing between said wheels, two bevel pinions fixed on said spindle so that relative movement of the spindle and the sheath will engage one pinion with one of the wheels and disengage the other pinion from the other wheel, and means under the control of the driver to impart said relative movement.

2. In a change speed gear for motor vehicles and in combination, a driving axle in two portions, a differential gear connecting said portions, a sheath for said gear, two opposed hyperboloid toothed wheels of differing diameter secured thereon, a spindle driven from the engine, said spindle being arranged transverse of the axis of said sheath and passing between said wheels, two bevel pinions fixed on said spindle so that movements of the sheath in the general direction of its axis will engage one pinion with one of the wheels and disengage the other pinion from the other wheel and means under the control of the driver to impart said movements to the sheath.

3. In a change speed gear for motor vehicles and in combination, a driving axle in two portions, a differential gear connecting said portions, a sheath for said gear, two opposed hyperboloid toothed wheels of differing diameter secured thereon, a spindle driven from the engine, said spindle being arranged transverse of the axis of said sheath and passing between said wheels, two bevel pinions fixed on said spindle so that movements of the sheath in the general direction of its axis will engage one pinion with one of the wheels and disengage the other pinion from the other wheel and means under the control of the driver to impart said movements to the sheath, said means comprising a sleeve loose on said sheath capable of rotary but not of longitudinal movement, an operative connection between the sleeve and the sheath whereby rotary movement of the sleeve imparts movement to the sheath in the direction of its axis and means to rotate the sleeve.

In testimony whereof we have signed our names to this specification in the presence of two subscribing witnesses.

GUSTAVE CORNILLEAU.
AUGUSTE SAINTE-BEUVE.

Witnesses:
HANSON C. COXE,
GEORGES BONNEUIL.